US010451435B2

(12) United States Patent
Turner

(10) Patent No.: US 10,451,435 B2
(45) Date of Patent: Oct. 22, 2019

(54) METHOD OF USING GPS MAP INFORMATION TO HIGHLIGHT ROAD MARKINGS ON A HEAD UP DISPLAY THAT OTHERWISE MAY BE NON-VISIBLE DUE TO INCLEMENT WEATHER

(71) Applicant: Panasonic Automotive Systems Company of America, Division of Panasonic Corporation of North America, Peachtree City, GA (US)

(72) Inventor: Donald Allen Turner, Livonia, MI (US)

(73) Assignee: Panasonic Automotive Systems Company of America, Division of Panasonic of North American, Peachtree City, GA (US)

( * ) Notice: Subject to any disclaimer, the term of this patent is extended or adjusted under 35 U.S.C. 154(b) by 221 days.

(21) Appl. No.: 15/606,368

(22) Filed: May 26, 2017

(65) Prior Publication Data
US 2017/0350720 A1    Dec. 7, 2017

Related U.S. Application Data

(60) Provisional application No. 62/345,237, filed on Jun. 3, 2016.

(51) Int. Cl.
| | | |
|---|---|---|
| *G01C 21/36* | (2006.01) | |
| *G06F 16/29* | (2019.01) | |
| *G01W 1/00* | (2006.01) | |

(52) U.S. Cl.
CPC ......... *G01C 21/3691* (2013.01); *G06F 16/29* (2019.01); *G01W 2001/006* (2013.01)

(58) Field of Classification Search
USPC .......................................................... 701/415
See application file for complete search history.

(56) References Cited

U.S. PATENT DOCUMENTS

| | | | |
|---|---|---|---|
| 2010/0292886 A1* | 11/2010 | Szczerba | G01C 21/365 701/31.4 |
| 2011/0301813 A1* | 12/2011 | Sun | B62D 15/029 701/41 |
| 2013/0141311 A1* | 6/2013 | Ho | G09G 3/003 345/7 |

(Continued)

*Primary Examiner* — Tyler D Paige
(74) *Attorney, Agent, or Firm* — Laurence S. Roach, Esq.

(57) ABSTRACT

A head up display arrangement for a motor vehicle includes a global positioning system module emitting geographic location coordinates associated with the motor vehicle. A database includes lane marking location data stored in association with corresponding geographic location coordinates. An electronic processing device is communicatively coupled to the global positioning system module and to the database. The electronic processing device receives the geographic location coordinates and retrieves from the database lane marking location data stored in association with the received geographic location coordinates. The electronic processing device transmits the retrieved lane marking location data. A head up display is communicatively coupled to the electronic processing device and receives the transmitted lane marking location data. The head up display displays virtual lane markings dependent upon the received lane marking location data.

20 Claims, 3 Drawing Sheets

(56) References Cited

U.S. PATENT DOCUMENTS

| | | | |
|---|---|---|---|
| 2015/0032800 A1* | 1/2015 | Hrabak | B60R 16/0231 |
| | | | 709/203 |
| 2015/0356872 A1* | 12/2015 | Atsmon | G08G 1/0112 |
| | | | 701/522 |
| 2016/0109701 A1* | 4/2016 | Goldman-Shenhar | |
| | | | G02B 27/01 |
| | | | 345/8 |
| 2016/0129836 A1* | 5/2016 | Sugita | B60K 35/00 |
| | | | 701/41 |
| 2017/0350720 A1* | 12/2017 | Turner | G01C 21/3691 |
| 2018/0031384 A1* | 2/2018 | Lee | G01C 21/365 |
| 2018/0031849 A1* | 2/2018 | Omanovic | B60K 35/00 |
| 2018/0058873 A1* | 3/2018 | Huang | G01C 21/365 |
| 2018/0370567 A1* | 12/2018 | Rowell | G06T 11/00 |

\* cited by examiner

METHOD OF USING GPS MAP INFORMATION TO HIGHLIGHT ROAD MARKINGS ON A HEAD UP DISPLAY THAT OTHERWISE MAY BE NON-VISIBLE DUE TO INCLEMENT WEATHER

CROSS-REFERENCED TO RELATED APPLICATIONS

This application claims benefit of U.S. Provisional Application No. 62/345,237 filed on Jun. 3, 2016, which the disclosure of which is hereby incorporated by reference in its entirety for all purposes.

FIELD OF THE INVENTION

The disclosure relates to a head up display (HUD) in a motor vehicle.

BACKGROUND OF THE INVENTION

A head up display emits light that reflects from the front windshield to be seen by the driver. The light appears to come from a virtual image in front of the driver and in front of the windshield.

Conventional head up displays create the virtual image by first using a display to create an image. Next, the light from the image is reflected from one or more mirrors, and then the light from the mirrors is reflected from the interior surface of the windshield. The mirrors are designed and positioned relative to the display so that the light seen by the driver, which is reflected from the windshield, appears to come from a virtual image that is outside of the vehicle. The mirrors and display are typically contained in a package that occupies a volume beneath the top surface of the dashboard.

FIG. 1 illustrates an example view from the driver's seat and through the windshield of a vehicle of the prior art with snow on the ground. The lane markers are covered by the snow and are not visible. Thus, the driver may have difficulty judging in which direction to safely steer the vehicle. More particularly, without being able to see the lane markers, the driver may have difficulty keeping the vehicle in its lane.

SUMMARY

The present invention may utilize GPS map/road data in a vehicle head up display to show proper road lane markings during inclement weather such as heavy snow which prevents the roadway from being seen by the driver.

In one embodiment, the invention comprises a head up display arrangement for a motor vehicle including a global positioning system module emitting geographic location coordinates associated with the motor vehicle. A database includes lane marking location data stored in association with corresponding geographic location coordinates. An electronic processing device is communicatively coupled to the global positioning system module and to the database. The electronic processing device receives the geographic location coordinates and retrieves from the database lane marking location data stored in association with the received geographic location coordinates. The electronic processing device transmits the retrieved lane marking location data. A head up display is communicatively coupled to the electronic processing device and receives the transmitted lane marking location data. The head up display displays virtual lane markings dependent upon the received lane marking location data.

In another embodiment, the invention comprises a method of providing a head up display in a motor vehicle. Lane marking location data is stored in association with corresponding geographic location coordinates. A set of geographic location coordinates is received. The set of geographic location coordinates is associated with a position of the motor vehicle at a particular point in time. A set of the lane marking location data is retrieved from storage. The set of lane marking location data is stored in association with the received set of geographic location coordinates. Virtual lane markings are displayed on a head up display within the motor vehicle dependent upon the retrieved set of lane marking location data.

In yet another embodiment, the invention comprises a head up display arrangement for a motor vehicle, including a global positioning system module emitting current geographic location coordinates associated with the motor vehicle. A database includes lane marking location data stored in association with corresponding geographic location coordinates. An electronic processing device is communicatively coupled to the global positioning system module and to the database. The electronic processing device receives the current geographic location coordinates, and forecasts, based on the received current geographic location coordinates, future geographic location coordinates associated with the motor vehicle at a future time. The electronic processing device retrieves from the database lane marking location data stored in association with the forecasted future geographic location coordinates, and transmits the retrieved lane marking location data. A head up display is communicatively coupled to the electronic processing device and receives the transmitted lane marking location data. The head up display displays, at the future time, virtual lane markings dependent upon the received lane marking location data.

An advantage of the present invention is that it enables safer vehicle operation because road lane markings can be seen which otherwise would not be visible.

BRIEF DESCRIPTION OF THE DRAWINGS

A better understanding of the present invention will be had upon reference to the following description in conjunction with the accompanying drawings.

DETAILED DESCRIPTION OF THE PREFERRED EMBODIMENTS

Figure 1:
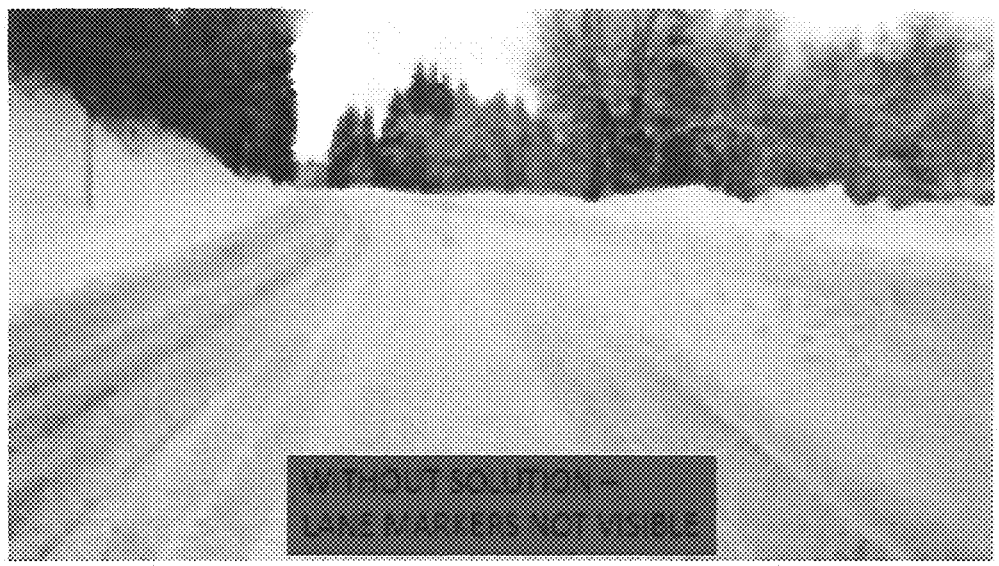
FIG. 1 is an example view through the windshield from the driver's seat with snow on the ground without the present invention.
Figure 2:
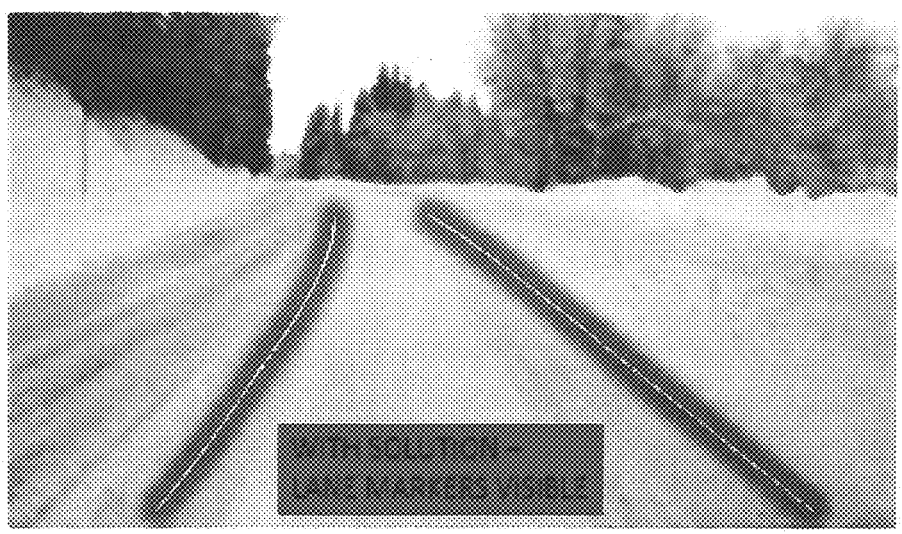
FIG. 2 is an example view through the windshield from the driver's seat with snow on the ground with the present invention.

FIG. 2 illustrates an example view with snow on the ground from the driver's seat and through the windshield of a vehicle including a head up display arrangement of the present invention. Based on the current geographical coordinates and traveling direction of the vehicle, the positions of the lane markers in the driver's field of view are retrieved from memory. The head up display may then provide a virtual image, visible to the driver, showing the positions of the lane markers in the driver's field of view in the form of virtual lane markers. The virtual lane markings may be displayed such that the virtual lane markings are superimposed over locations where the actual lane markings are known to be. The virtual lane markers may be in the form of colored, transparent highlighting.

Figure 3:
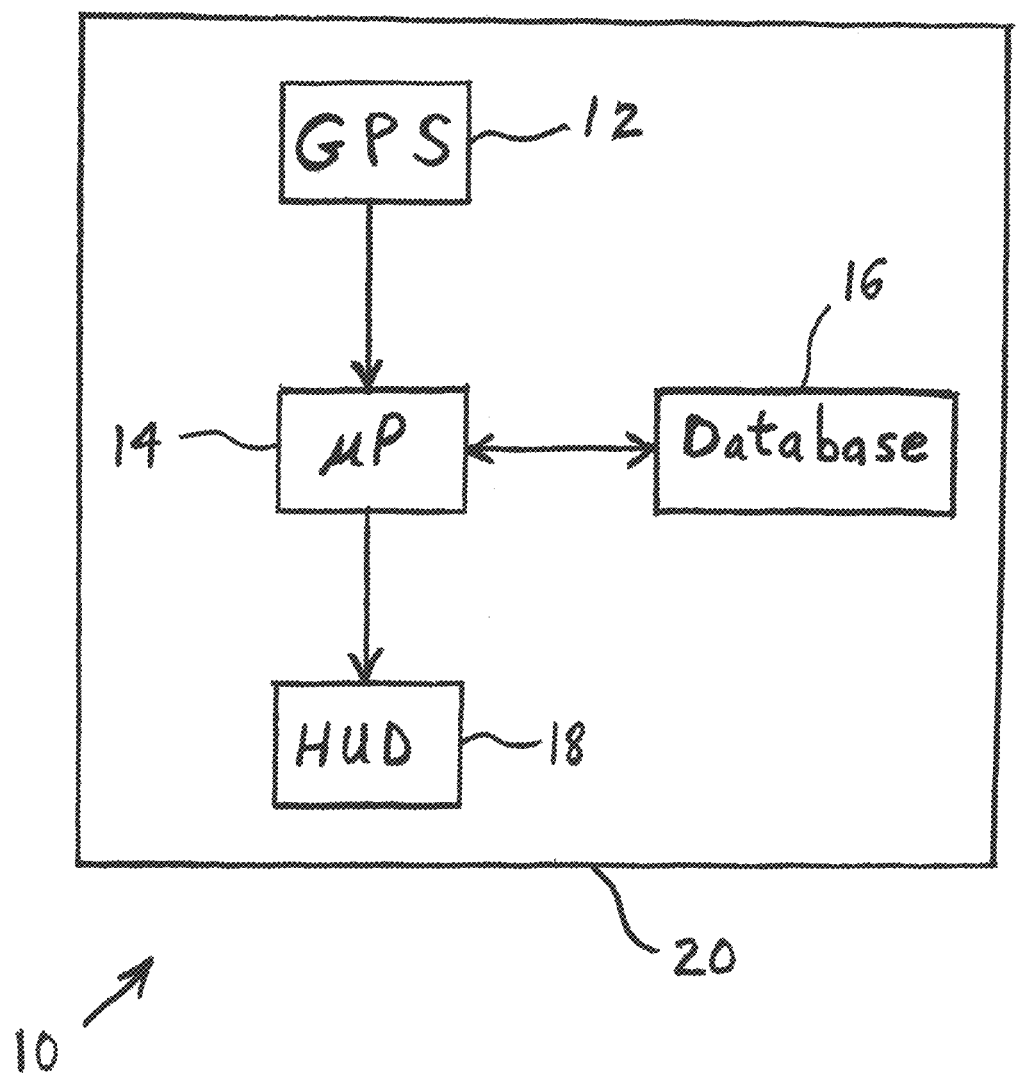
FIG. 3 is a block diagram of one embodiment of a head up display arrangement of the present invention.

FIG. 3 illustrates one example embodiment of a head up display arrangement 10 of the present invention, including a GPS module 12, an electronic processor 14, a database 16, and a head up display 18. The entire arrangement 10 may be disposed within a motor vehicle 20.

During use, GPS module 12 continually transmits its geographic global coordinates to processor 14. From this data, processor 14 may determine both the location of vehicle 20 and which of the two possible ways that vehicle 20 is traveling on the road. Processor 14 may then retrieve from database 16, based on the vehicle location and direction of travel, the positions of the lane markers in the driver's field of view through the vehicle's windshield. Processor 14 may then forward the received positions of the lane markers to HUD 18. HUD 18 may then include the corresponding virtual lane markers in the HUD-generated virtual image that is visible to the driver.

Database 16 may be either located within vehicle 20, as shown in FIG. 3, or located remotely and communicated with wirelessly by processor 14. In the case of a remote database 16, due to the time lag in communication, processor 14 may need to forecast the location of vehicle 20 in the near future (e.g., in one second to compensate for a one second lag in communication). This forecasted location may then be used to retrieve the lane marking data from the database.

Figure 4:
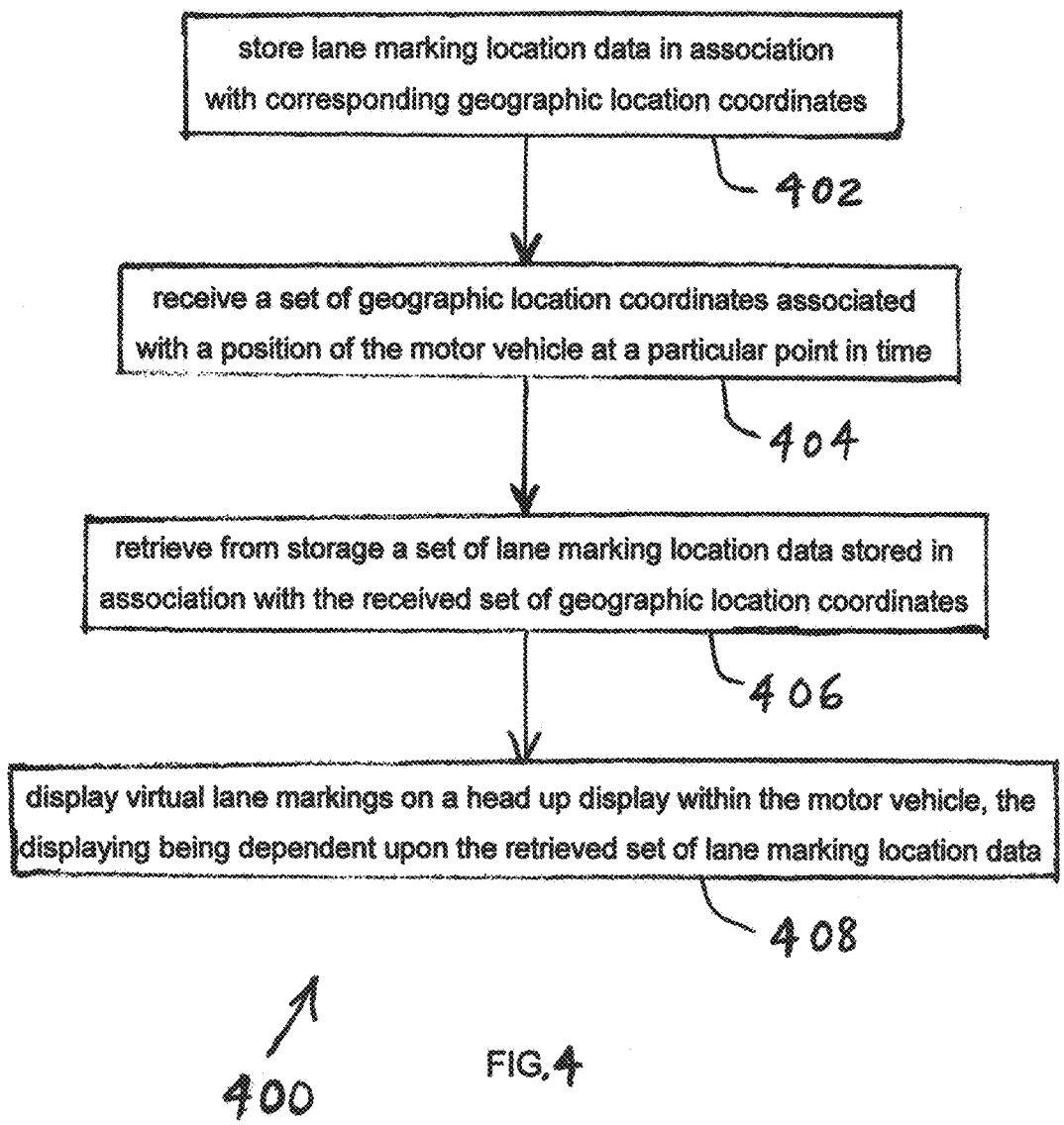
FIG. 4 is a flow chart of one embodiment of a method of the present invention for providing a head up display in a motor vehicle.

FIG. 4 illustrates a flow chart of one embodiment of a method 400 of the present invention for providing a head up display in a motor vehicle. In a first step 402, lane marking location data is stored in association with corresponding geographic location coordinates. For example, a data-gathering vehicle may drive on roads, capture video images of the road, and record GPS vehicle location coordinates. The lane markings may be extracted from each captured video image of the road and stored in memory in association with the GPS vehicle location coordinates that were recorded at the same time that the video image was captured.

Next, in step 404, a set of geographic location coordinates is received. The set of geographic location coordinates is associated with a position of the motor vehicle at a particular point in time. For example, as a vehicle 20 is traveling on a road, a GPS module 12 within the vehicle 20 may continuously provide changing geographic location coordinates as the vehicle 20 moves.

In a next step 406, a set of lane marking location data is retrieved from storage. The set of lane marking location data is stored in association with the received set of geographic location coordinates. For example, a set of lane marking location data stored in association with the set of geographic location coordinates that was received in step 404 may be retrieved from database 16.

In a final step 408, virtual lane markings are displaying on a head up display within the motor vehicle. The displaying is dependent upon the retrieved set of lane marking location data. For example, the set of lane marking location data retrieved from storage in step 406 may be used to create an image of lane markings that is presented by HUD 18.

The foregoing description may refer to "motor vehicle", "automobile", "automotive", or similar expressions. It is to be understood that these terms are not intended to limit the invention to any particular type of transportation vehicle. Rather, the invention may be applied to any type of transportation vehicle whether traveling by air, water, or ground, such as airplanes, boats, etc.

The foregoing detailed description is given primarily for clearness of understanding and no unnecessary limitations are to be understood therefrom for modifications can be made by those skilled in the art upon reading this disclosure and may be made without departing from the spirit of the invention.

What is claimed is:

1. A head up display arrangement for a motor vehicle, the arrangement comprising:
    a global positioning system module configured to emit geographic location coordinates associated with the motor vehicle;
    a database including lane marking location data stored in association with corresponding said geographic location coordinates;
    an electronic processing device communicatively coupled to the global positioning system module and to the database, the electronic processing device being configured to:
        receive the geographic location coordinates;
        retrieve from the database lane marking location data stored in association with the received geographic location coordinates; and
        transmit the retrieved lane marking location data; and
    a head up display communicatively coupled to the electronic processing device and configured to:
        receive the transmitted lane marking location data; and
        display virtual lane markings dependent upon the received lane marking location data, wherein the virtual lane markings comprise transparent colored highlighting.

2. The head up display arrangement of claim 1 wherein the electronic processing device is configured to determine a direction of travel of the motor vehicle, the lane marking location data being stored in the database in association with corresponding said directions of travel.

3. The head up display arrangement of claim 1 wherein the lane marking location data comprise positions of the lane markers in the driver's field of view.

4. The head up display arrangement of claim 1 wherein the global positioning system module, the database, the electronic processor, and the head up display are each disposed within the motor vehicle.

5. The head up display arrangement of claim 1 wherein the database is disposed remotely from the vehicle, and the electronic processing device is configured to wirelessly retrieve from the database the lane marking location data.

6. The head up display arrangement of claim 1 wherein the virtual lane markings are displayed such that the virtual lane markings are superimposed over locations of actual lane markings.

7. A method of providing a head up display in a motor vehicle, the method comprising:
    storing lane marking location data in association with corresponding geographic location coordinates;
    receiving a set of said geographic location coordinates, the set of geographic location coordinates being associated with a position of the motor vehicle at a particular point in time;

retrieving from storage a set of said lane marking location data, the set of lane marking location data being stored in association with the received set of geographic location coordinates; and displaying virtual lane markings on a head up display within the motor vehicle, the displaying being dependent upon the retrieved set of lane marking location data, wherein the virtual lane markings comprise transparent colored highlighting.

8. The method of claim 7 further comprising determining a direction of travel of the motor vehicle, the lane marking location data being stored in association with corresponding said directions of travel.

9. The method of claim 7 wherein the lane marking location data comprise positions of the lane markers in the driver's field of view.

10. The method of claim 7 wherein each of the steps occurs entirely within the motor vehicle.

11. The method of claim 7 wherein the lane marking location data is stored remotely from the motor vehicle, and the set of said lane marking location data is wirelessly retrieved from storage.

12. The method of claim 7 wherein the virtual lane markings are displayed such that the virtual lane markings are superimposed over locations of actual lane markings.

13. A head up display arrangement for a motor vehicle, the arrangement comprising:

a global positioning system module configured to emit current geographic location coordinates associated with the motor vehicle;

a database including lane marking location data stored in association with corresponding said geographic location coordinates;

an electronic processing device communicatively coupled to the global positioning system module and to the database, the electronic processing device being configured to:

receive the current geographic location coordinates;

forecast, based on the received current geographic location coordinates, future geographic location coordinates associated with the motor vehicle at a future time;

retrieve from the database lane marking location data stored in association with the forecasted future geographic location coordinates; and transmit the retrieved lane marking location data; and a head up display communicatively coupled to the electronic processing device and configured to:

receive the transmitted lane marking location data; and display, at the future time, virtual lane markings dependent upon the received lane marking location data, wherein the virtual lane markings comprise transparent colored highlighting.

14. The head up display arrangement of claim 13 wherein the electronic processing device is configured to determine a direction of travel of the motor vehicle, the lane marking location data being stored in the database in association with corresponding said directions of travel.

15. The head up display arrangement of claim 13 wherein the lane marking location data comprise positions of the lane markers in the driver's field of view.

16. The head up display arrangement of claim 13 wherein the global positioning system module, the database, the electronic processor, and the head up display are each disposed within the motor vehicle.

17. The head up display arrangement of claim 13 wherein the database is disposed remotely from the vehicle, and the electronic processing device is configured to wirelessly retrieve from the database the lane marking location data.

18. The head up display arrangement of claim 13 wherein the virtual lane markings are displayed such that the virtual lane markings are superimposed over locations of actual lane markings.

19. The head up display arrangement of claim 18 wherein the virtual lane markings are displayed such that the actual lane markings are not visible.

20. The head up display arrangement of claim 18 wherein the virtual lane markings are displayed such that the actual lane markings are visible.

\* \* \* \* \*